March 29, 1927.    E. H. SCHAEFFER ET AL    1,622,468
TIRE SPREADER
Filed Nov. 6, 1926
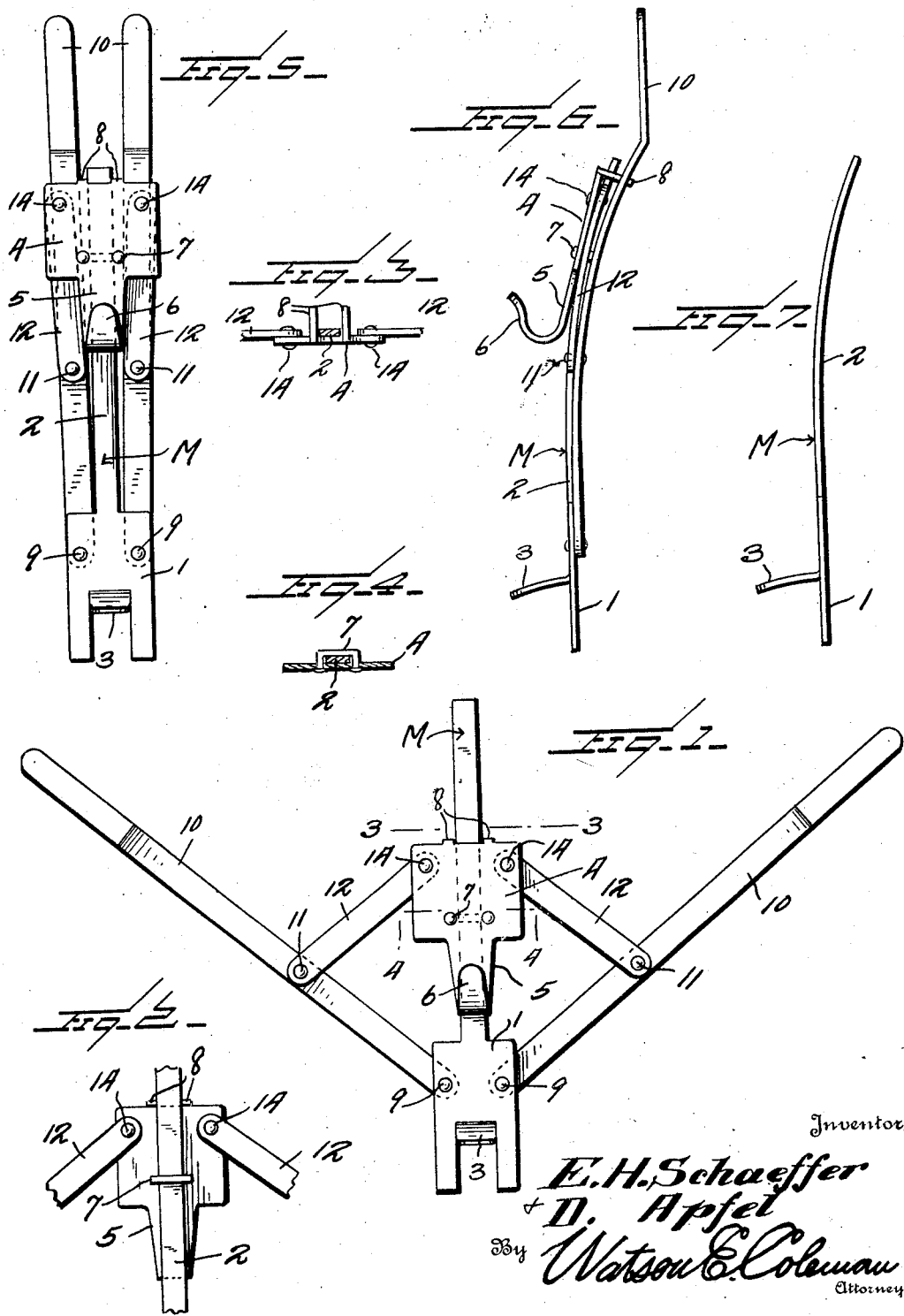
Inventors
E. H. Schaeffer
& D. Apfel
By Watson E. Coleman
Attorney Patented Mar. 29, 1927.

1,622,463

UNITED STATES PATENT OFFICE.

ELMER H. SCHAEFFER AND DAVID APFEL, OF READING, PENNSYLVANIA.

TIRE SPREADER.

Application filed November 6, 1926. Serial No. 146,765.

This invention relates to tire spreaders and it is an object of the invention to provide a device of this kind operating to spread the beads or marginal portions of a tire in order to permit convenient access to the interior of the tire to facilitate inspection or to maintain the tire in required position when desired to perform a required operation upon the interior thereof.

It is also an object of the invention to provide a device of this kind which, when operated to spread the tire, is automatically locked in such position.

The invention consists in the details of construction and in the combination and arrangement of the several parts of our improved tire spreader whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in elevation of a tire spreader constructed in accordance with an embodiment of our invention and in what may be termed closed position;

Figure 2 is a fragmentary rear elevational view illustrating the mounting for the slidable member as herein embodied;

Figure 3 is a sectional view taken substantially on the line 3—3 of Figure 1;

Figure 4 is a sectional view taken substantially on the line 4—4 of Figure 1;

Figure 5 is an elevational view illustrating the device in what may be termed open position;

Figure 6 is a view in side elevation of the structure illustrated in Figure 5;

Figure 7 is a view in side elevation of the main or body member.

As disclosed in the accompanying drawings, M denotes a main or body member comprising a plate 1 of desired dimensions and from one end of which extends a centrally arranged elongated arm 2. This arm 2 is disposed longitudinally on a predetermined curvature to facilitate the functioning of the device. The outer end portion of the plate 1 has struck therefrom an outstanding finger or lug 3 which, in practice, is adapted to engage from within a longitudinal marginal portion or bead of a tire to be spread.

Slidable along the arm 2 is a second plate 4, the inner end of which being provided at its central portion with an arm 5 disposed toward the plate 1 and terminating in a return extension 6 adapted to be engaged from within with a second or opposite longitudinal marginal portion or bead of the tire to be spread.

This plate 4 has secured thereto a U-shaped member 7 disposed rearwardly thereof and straddling the arm 2 to facilitate the desired sliding movement of the plate 4 along the arm 5. The outer end of the plate 4 is further provided with the substantially perpendicularly related spaced fingers 8 between which the arm 2 is snugly arranged to further facilitate the maintenance of the plate 4 in desired position upon the arm 2.

Pivotally connected, as at 9, with the plate 1 at transversely spaced points are the inner extremities of the elongated handle members 10. Each of the members 10 has pivotally connected therewith, as at 11, an end portion of a rigid link 12, the opposite end portion of which being pivotally connected, as at 14, with a side marginal portion of the plate 4 adjacent to the outer end thereof.

Upon outward or separating swinging movement of the members 10 the plate 4 will be caused to move along the arm 2 toward the plate 1 and when in such position to permit the finger or lug 3 and the return extension 6 of the arm 5 to properly engage with the marginal portions or beads of the tire. Upon swinging movement of the arms 10 one toward the other, the plate 4 will move outwardly of the arm 2 resulting in the desired spreading of the tire. This inward movement of the members 10 is limited by contact with the fingers 8 and when at the limit of such movement, the pivotal connections 11 are disposed inwardly of the pivotal connections 14, thus rendering the device self-locking, facilitating desired access to the interior of the tire for inspection or otherwise as the requirements of practice may necessitate. When in such position with respect to the tire, the device may also be readily shifted circumferentially of the tire to further facilitate interior inspection and especially when desired to locate a puncturing element which may be projecting through the wall of the tire.

From the foregoing description it is thought to be obvious that a tire spreader constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A tire spreader comprising a plate having an outstanding lug and provided with an elongated arm, a second plate slidably engaged with said arm, said plate having an arm disposed toward the first named plate and terminating in a return extension, operating members pivotally engaged with the first named plate, and rigid links pivotally engaged with said operating members and with the second plate.

2. A tire spreader comprising a plate having an outstanding lug and provided with an elongated arm, a second plate slidably engaged with said arm, said plate having an arm disposed toward the first named plate and terminating in a return extension, operating members pivotally engaged with the first named plate, rigid links pivotally engaged with said operating members and with the second plate, and means for limiting the inward movement of the operating members, the pivotal connection between the links and operating members, when the operating members are at the limit of such inward movement, being disposed inwardly of the pivotal connection between said links and the second plate.

3. A tire spreader comprising a plate having an outstanding lug and having an elongated arm extending therefrom, a second plate, a member connecting said second plate with the arm for sliding movement therealong, said second plate being provided with a tire engaging member, operating members pivotally engaged with the first plate, and rigid links pivotally engaged with the operating members and the second plate.

4. A tire spreader comprising a plate having an outstanding lug and having an elongated arm extending therefrom, a second plate, a member connecting said second plate with the arm for sliding movement therealong, said second plate being provided with a tire engaging member, operating members pivotally engaged with the first plate, and rigid links pivotally engaged with the operating members and the second plate, said second plate having laterally disposed fingers arranged at opposite sides of the arm.

5. A tire spreader comprising a plate having an outstanding lug and having an elongated arm extending therefrom, a second plate, a member connecting said second plate with the arm for sliding movement therealong, said second plate being provided with a tire engaging member, operating members pivotally engaged with the first plate, and rigid links pivotally engaged with the operating members and the second plate, said second plate having laterally disposed fingers arranged at opposite sides of the arm, the operating members contacting with said fingers to limit the inward movement of said operating members.

In testimony whereof we hereunto affix our signatures.

ELMER H. SCHAEFFER.
DAVID APFEL.